US007126148B2

(12) United States Patent
Murray et al.

(10) Patent No.: US 7,126,148 B2
(45) Date of Patent: Oct. 24, 2006

(54) NEUTRON DETECTION BASED ON BORON ACTIVATED LIQUID SCINTILLATION

(75) Inventors: George M. Murray, Columbia, MD (US); Harvey W. Ko, Ellicott City, MD (US); Glen Southard, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 228 days.

(21) Appl. No.: 10/621,595

(22) Filed: Jul. 17, 2003

(65) Prior Publication Data

US 2004/0051048 A1 Mar. 18, 2004

Related U.S. Application Data

(60) Provisional application No. 60/396,897, filed on Jul. 17, 2002.

(51) Int. Cl.
*G01V 5/10* (2006.01)
(52) U.S. Cl. .............. 250/900; 250/269.4; 250/390.01; 250/370.05
(58) Field of Classification Search .............. 250/900, 250/269.4, 390.01, 370.05
See application file for complete search history.

(56) References Cited

U.S. PATENT DOCUMENTS

| 3,233,103 | A | | 2/1966 | Aoki |
| 3,372,127 | A | | 3/1968 | Thomas, Jr. |
| 3,470,390 | A | * | 9/1969 | Lin ............................ 327/325 |
| 3,573,220 | A | | 3/1971 | Benson |
| 3,999,070 | A | * | 12/1976 | Tarkkanen .................. 250/362 |
| 4,262,202 | A | * | 4/1981 | Cusano et al. .............. 250/366 |
| 4,415,808 | A | * | 11/1983 | Cusano et al. .............. 250/367 |
| 4,620,939 | A | * | 11/1986 | Maeda et al. ........... 252/301.17 |
| 4,975,222 | A | * | 12/1990 | Yoshino et al. .............. 252/586 |
| 5,095,099 | A | * | 3/1992 | Parkinson et al. ............. 534/15 |
| 5,514,870 | A | * | 5/1996 | Langenbrunner ........... 250/367 |
| 5,606,638 | A | | 2/1997 | Tymianski |

(Continued)

FOREIGN PATENT DOCUMENTS

GB 998117 7/1965

(Continued)

OTHER PUBLICATIONS

Large Area Imaging Detector for Neutron Scattering Based on Boron-Rich Liquid Scintillator, D. Vartsky and M.B. Goldberg, et al., Nucl. Instr. & Method A, Jul. 2002.

(Continued)

*Primary Examiner*—Otilia Gabor
*Assistant Examiner*—Christine Sung
(74) *Attorney, Agent, or Firm*—Albert J. Fasulo, II

(57) ABSTRACT

A system for detecting neutron radiation. A liquid cocktail mixture comprised of a neutron absorber and a scintillator is housed in a Teflon® tube having a mirror at one end of the tube and a windowed portal at the other end of the tube. Neutrons that penetrate the tube react with the neutron absorber producing ionization that excites a scintillator to produce photons. A photo-multiplier tube is coupled with the windowed portal for receiving photons and converting the photons to electrical signals. A processing device is coupled to the photo-multiplier output for receiving and analyzing the electrical signals so as to provide a measurement pertaining to the presence and relative strength of neutron radiation. The tube can be adapted to function as a portable survey instrument. Alternatively, the tube can be stretched to cover large apertured areas. In such implementations a wavelength shifter is employed to convert light emitted to another wavelength giving a multiplier effect necessary for long light guides.

18 Claims, 1 Drawing Sheet

102 – Teflon Tube
104 – Mirrored End
106 – Windowed End
108 – Cocktail Mixture
109 – Neutrons
110 – Photons (after absorption & scintillation reactions)
112 – Photo-multiplier Tube
114 – Electrical Signals
116 - Photo-multiplier / Computer Interface
118 – Computer (processing device)

U.S. PATENT DOCUMENTS

| | | | |
|---|---|---|---|
| 5,698,397 A * | 12/1997 | Zarling et al. | 435/6 |
| 5,734,166 A | 3/1998 | Czirr | |
| 2003/0175874 A1 * | 9/2003 | Baker et al. | 435/69.1 |
| 2003/0226971 A1 * | 12/2003 | Chandross et al. | 250/361 R |
| 2005/0135535 A1 * | 6/2005 | Wallace | 376/153 |

FOREIGN PATENT DOCUMENTS

| | | |
|---|---|---|
| GB | 960448 | 6/1974 |
| KP | 405333158 A | 12/1993 |

OTHER PUBLICATIONS

Neutron Counting, Detector ApplicationsInformation Note, Bicron, www.bicron.com, Mar. 1997.

Research Program of the TEXONO Collaboration: Status and Highlights, Wong and Li, Mar. 8, 1001, 1st NCTS Workshop on Astro-Particle Physics, Taiwan, Dec. 2001.

A Feasibility Study of Boron-Loaded liquid Scintillator for the Detection of Electron Anti-Neutrinos, SC Wang, et al. Oct. 20, 1998, Nuclear Instr. and Methods in Physics Research A 432 (1999) 111-121.

* cited by examiner

102 – Teflon Tube
104 – Mirrored End
106 – Windowed End
108 – Cocktail Mixture
109 – Neutrons
110 – Photons (after absorption & scintillation reactions)
112 – Photo-multiplier Tube
114 – Electrical Signals
116 - Photo-multiplier / Computer Interface
118 – Computer (processing device)

NEUTRON DETECTION BASED ON BORON ACTIVATED LIQUID SCINTILLATION

CROSS REFERENCE TO RELATED APPLICATIONS

This application is related to and claims the benefit of U.S. Provisional Patent Application Ser. No. 60/396,897, filed Jul. 17, 2002 entitled "Sensitive Neutron Detection Based on Boron Activated Liquid Scintillation".

BACKGROUND

There is a tremendous need for a reliable, accurate, and fast acting means for detecting potentially dangerous nuclear materials. Currently, there is a lack of suitable neutron detectors to screen for hidden nuclear devices. Neutron detection is a preferred radiation detection technique because the detection of neutrons is very selective toward threats. There are only two terrestrial sources of neutrons: (1) particle accelerators with suitable targets; and (2) fissile materials. Particle accelerators are immobile, therefore detection of neutrons from a container means fissile material. Fissile materials form two threats. One is as a nuclear weapon, the other as a "dirty bomb", a source of highly radioactive contamination. The only valid source of neutrons would be a source for medical use, which is clearly marked and its transport is heavily regulated.

SUMMARY

The goal of the present invention is to produce a neutron detector based on a combination of neutron absorption and liquid scintillation. Thus, the present invention can be characterized as a liquid scintillation spectrometer (LSS). The LSS of the present invention is deployable as both a survey instrument and, by using a liquid light guide approach, as a large aperture area monitor.

The present invention comprises a system for detecting neutron radiation. A liquid cocktail mixture comprised of a neutron absorber and a scintillator is housed in a Teflon® tube having a mirror at one end of the tube and a windowed portal at the other end of the tube. Neutrons that penetrate the tube react with the neutron absorber producing ionization that excites the scintillator to produce photons. A photo-multiplier tube is coupled with the windowed portal for receiving photons and converting the photons to electrical signals. A processing device is coupled to the photo-multiplier output for receiving and analyzing the electrical signals so as to provide a measurement pertaining to the presence and relative strength of neutron radiation. The tube can be modified to cover large apertured areas. In such implementations a wavelength shifter is employed to convert light emitted to another wavelength giving a multiplier effect necessary for long light guides.

Alternatively, the tube can be configured to be portable such that the system of the present invention can act as a survey instrument akin to a Geiger counter. In this embodiment, the tube containing the cocktail mixture is easily transportable to areas of interest or suspected hot spots to check for neutron radiation. The photo-multiplier tube can be attached to both the tube and a portable computer such as a laptop on-site.

DETAILED DESCRIPTION

Figure 1:
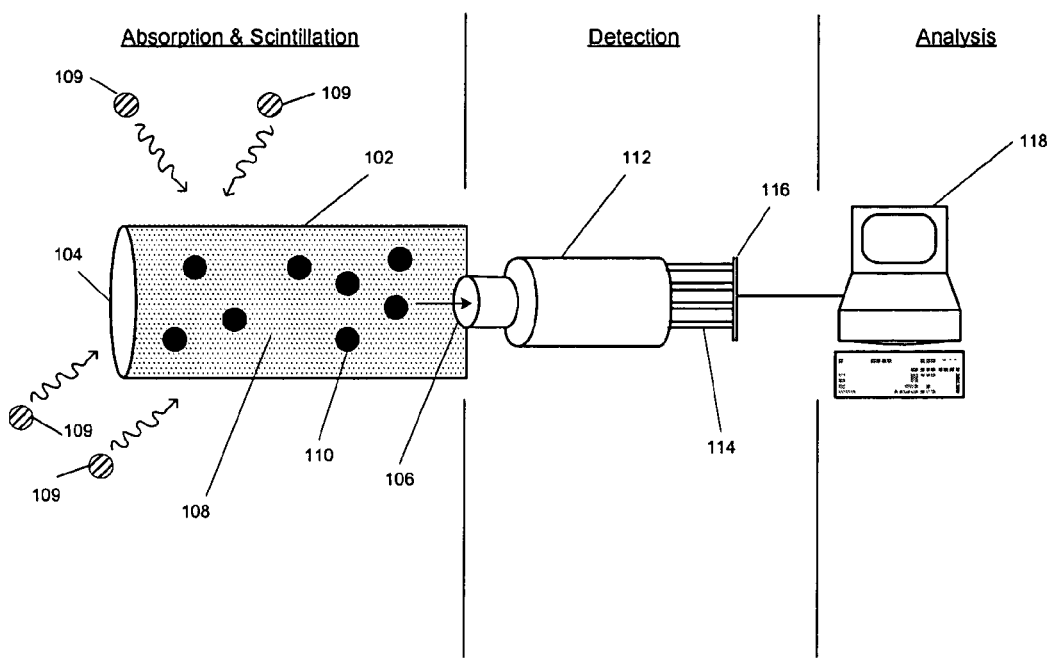
FIG. 1 illustrates a block diagram of components that comprise an embodiment of the present invention.

The present invention describes an approach for the detection of neutrons that is significantly more sensitive than current systems and methods. The approach combines neutron absorption with liquid scintillation. Neutron absorption is the process of capturing a neutron resulting in a nuclear reaction that generates ions and radiation that excites a scintillation mixture. Scintillation is the process of exciting an atom, ion, or molecule to a high energy state. Upon relaxation to the excited species to its ground state a photon is emitted. The photons are subsequently guided into a detection device such as a photo-multiplier tube that converts the light energy to electrical signals. The electrical signals are then fed to a processing device for analysis. Thus, the present invention can be deconvolved into four functional areas: (1) neutron absorption; (2) liquid scintillation; (3) photon detection and electrical conversion; and (4) analysis.

Because neutrons do not directly cause either ionization or scintillation, they must first interact with an intermediate absorber that has the ability to absorb neutrons and undergo a nuclear reaction such as $^3He(n,p)^3H$; $^6Li(n,\alpha)^3H$; or $^{10}B(n,\alpha)^7Li$. The absorber reactions produce ionization that can be detected using scintillation techniques.

The absorbers can be in a gaseous, liquid, or solid form. Gaseous absorbers are less sensitive to neutrons due to low absorber concentration. Solid absorbers are more dense and therefore more sensitive, but tend to degrade with use and are less flexible to deploy about large apertures. For gaseous absorbers, boron trifluoride or helium are the usual absorber gasses. For solid absorbers the absorber is typically a lithium (Li) salt.

The present invention uses a water soluble boron containing additive as the absorber. Some possible absorber compositions include $LiBF_4$ (lithium tetrafluoroborate), LiCl (lithium chloride), or $NaBF_4$ (sodium tetrafluoroborate).

Once neutrons have been captured, the resulting nuclear process will cause scintillation. There are scintillators for alpha, beta, gamma, and neutron radiation. Scintillators can be made from plastic, organic, or inorganic materials. They can be solid, liquid, or gas and can be made in all shapes and sizes. Scintillators can be used with portable survey meters or fixed equipment. Incoming radiation, such as a neutron, interacts with a scintillating material and a portion of or the total energy is transferred to the scintillating material. The excited scintillating molecules produce light photons during the relaxation process. Scintillators can exist in many forms such as crystals, liquids, plastic solids, and gases. However, each of these forms depend on the phenomenon that the suitable fluors (primary solutes) give off pulses of light when a charged particle passes through them.

In the present invention, the neutron absorber formula is dissolved in water with a liquid scintillation composition yielding an absorber/scintillation liquid cocktail. The result is a non-toxic neutron only detector that provides the high absorber concentration with the advantage of a solid absorber while ameliorating the loss of transparency due to damage caused by a resulting interaction. The present invention uses a lanthanide chelate in the liquid scintillation composition. The liquid scintillation composition is a tris complex of 2,6-pyridine dicarboxylic acid (dipicolinic acid) $Li_3[Eu(DPA)_3]$. Most of the lanthanides can be used, however, there are four that work particularly well including europium (Eu), samarium (Sm), dysprosium (Dy), and terbium (Tb). When a neutron reacts with the liquid scintillation composition the scintillation composition will emit photon(s).

Another advantageous feature of the present invention is that the "cocktail" can be formulated for self-repair since additional ligands may be added to the cocktail to regenerate the scintillation complexes.

The foregoing provides for portable neutron detection in that the cocktail can be housed in a relatively small container capable of being attached to a photo-multiplier device. The present invention can also be adapted to screen larger areas by housing the cocktail in a tubular long liquid light guide made from a Teflon® derivative, Teflon® AF (Amorphous Fluoropolymer), as it has the correct refractive index.

In a liquid light guide implementation, some photons generated by scintillation will have to travel the length of the light guide to reach the end of the light guide that is connected to a photo-multiplier tube. The use of wavelength shifters for scintillation normally provides light at a wavelength of high detector sensitivity. Wavelength shifting can also provide photon multiplication, which is useful for longer light guides. Using a lanthanide complex scintillation composition, which has a large Stokes shift and accordingly no self-absorbance, provides extremely low-loss light propagation. Thus, the present invention can be adapted for long liquid light guides. This is especially useful for detection areas having large apertures such as tunnel entrances.

In the present invention, a rare earth chelate (europium) converts blue light produced by the primary scintillator to red light. The conversion to red light eliminates the chance of re-absorption of the red light by the primary scintillator while the absorbance of red light by rare earth ions is extremely weak. The red light is then directed to a photo-multiplier tube for detection and analysis.

A photo-multiplier tube is typically comprised of a photocathode and a series of dynodes in an evacuated glass enclosure. Photons strike a photoemissive cathode, which emits electrons due to the photoelectric effect. Instead of collecting these few electrons, the electrons are accelerated towards a series of additional electrodes called dynodes. These electrodes are each maintained at a more positive potential. Additional electrons are generated at each dynode. This cascading effect creates $10^5$ to $10^7$ electrons for each photon hitting the first cathode depending on the number of dynodes and the accelerating voltage. The result is an amplified signal that is finally collected at the anode where it can be measured.

The last functional aspect of the present invention is to analyze the results of any photo-multiplier reactions. Electrical signals created by the photo-multiplier tube can be fed to a computer to be analyzed and processed. The computer can be periodically connected to the photo-multiplier tube to determine if the photo-multiplier tube has detected any photons indicating the presence of neutrons. The intensity of the photo-multiplier signal can also indicate the threat level the neutrons represent.

Referring now to FIG. 1, an example apparatus constructed and arranged according to the present invention is comprised of a Teflon® tube 102 having an inner mirror coating 104 at one end of the tube. The other end of the tube will be terminated with an optical connection or window 106. That is, tube 102 has mirrored end 104 opposing windowed, portal end 106. The tube 102 is filled with a cocktail mixture 108 of a water soluble liquid scintillation composition and a boron containing additive. Fissile neutrons 109 penetrate the tube 102 and react with the cocktail mixture 108. Photons 110 resulting from the absorption of a neutron and scintillation are detected by a photo-multiplier tube 112 operating in a photon counting mode. The detected photons are converted to electrical signals 114. The electrical signals are then interfaced 116 (where interface 116 includes a photomultiplier/computer interface) and sent to a processing device 118, such as a computer, for analysis.

In a facility monitoring implementation, a cocktail mixture 108 comprised of a neutron absorber, a scintillator, and a wavelength shifter (optional) fills a length of transparent Teflon® tubing acting as a light pipe or liquid light guide. The long run of tubing can be wound around the facility to be monitored. The filled tubing can also be discretely positioned in a wall, a ceiling, or the flooring of a building. The tubing can also be installed in a variety of places to monitor vehicular and pedestrian traffic such as the entrance/exit to a tunnel or the area surrounding a toll booth.

As a portable survey instrument, the tube can be configured such that the system of the present invention can act akin to a portable Geiger counter. In this embodiment, the tube containing the cocktail mixture is easily transportable to areas of interest or suspected hot spots to check for neutron radiation. The photo-multiplier tube can be attached to both the tube and a portable computer such as a laptop on-site.

In the following claims, any means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

The invention claimed is:

1. A system for detecting neutron radiation comprising:
   a liquid cocktail mixture comprised of a neutron absorber dissolved in water with a liquid scintillator, the neutron absorber component selected from the group consisting of $LiBF_4$ (lithium tetrafluoroborate), LiCl (lithium chloride) and $NaBF_4$ (sodium tetrafluoroborate), said cocktail mixture housed in a tube having a mirror at one end of the tube and a windowed portal at the other end of the tube such that neutrons that penetrate the tube react with the neutron absorber producing ionization that excites the scintillator and produces photons;
   a photo-multiplier tube coupled with the windowed portal for receiving the photons and converting the photons to electrical signals; and
   a processing device for receiving and analyzing the electrical signals so as to provide a measurement pertaining to the presence and relative strength of neutron radiation,
   wherein the liquid cocktail mixture further comprises a rare earth chelate wavelength shifter for converting light omitted by the scintillator to another wavelength.

2. The system of claim 1 wherein the tube is a polytetrafluoroethylene (PTFE) tube acting as a liquid light guide, the liquid light guide capable of monitoring large apertured areas.

3. The system of claim 1 wherein the tube is a polytetrafluoroethylene (PTFE) tube modified for portable use as a survey instrument, the tube capable of being easily transported to areas of interest.

4. The system of claim 1 wherein the neutron absorber component of the cocktail mixture consists of $LiBF_4$.

5. The system of claim 1 wherein the neutron absorber component of the cocktail mixture consists of LiCl.

6. The system of claim 1 wherein the neutron absorber component of the cocktail mixture consists of $NaBF_4$.

7. The system of claim 1, wherein the scintillator component of the cocktail mixture is comprised of a tri complex of 2,6 pyradine dicaboxlic acid (dipicolinic acid) $Li_3[Eu(DPA)_3]$.

8. The liquid cocktail mixture of claim 7 wherein the liquid scintillator produces blue light and the rare earth chelate wavelength shifter converts the blue light to red light detectable by the photomultiplier tube.

9. The system of claim 1 wherein the rare earth chelate is europium.

10. The liquid cocktail mixture of claim 1 wherein the liquid scintillator produces blue light and the rare earth chelate wavelength shifter converts the blue light to red light detectable by the photomultiplier tube.

11. A liquid cocktail mixture for detecting the presence of neutrons comprising:
a neutron absorber component dissolved in water, the neutron absorber component selected from the group consisting of $LiBF_4$(lithium tetrafluoroborate), LiCl (lithium chloride) and $NaBF_4$ (sodium tetrafluoroborate);
a liquid scintillator component; and
a rare earth chelate wavelength shifter for converting light produced by the scintillator component to another wavelength.

12. The system of claim 1 wherein the neutron absorber component of the cocktail mixture consists of $LiBF_4$.

13. The system of claim 1 wherein the neutron absorber component of the cocktail mixture consists of LiCl.

14. The system of claim 1 wherein the neutron absorber component of the cocktail mixture consists of $NaBF_4$.

15. The system of claim 1, wherein the liquid scintillator component of the cocktail mixture is comprised of a tri complex of 2,6 pyradine dicaboxilic acid (dipicolinic acid) $Li_3[Eu(DPA)_3]$.

16. The liquid cocktail mixture of claim 15 wherein the liquid scintillator produces blue light and the rare earth chelate wavelength shifter converts the blue light to red light.

17. The liquid cocktail mixture of claim 11 wherein the rare earth chelate is europium.

18. The liquid cocktail mixture of claim 11 wherein the liquid scintillator produces blue light and the rare earth chelate wavelength shifter converts the blue light to red light.

\* \* \* \* \*